POWER LINE ANTENNA

Filed Jan. 6, 1949 2 Sheets-Sheet 1

INVENTOR.
JOHN DRYSDALE REID.
BY Alden D. Redfield.
Charles Marshall Hogan.
ATTYS.

Aug. 29, 1950 J. D. REID 2,520,811

POWER LINE ANTENNA

Filed Jan. 6, 1949 2 Sheets-Sheet 2

INVENTOR.
JOHN DRYSDALE REID.
BY Alden D. Redfield,
Charles Marshall Hogan.
ATTYS.

Patented Aug. 29, 1950

2,520,811

UNITED STATES PATENT OFFICE 2,520,811

POWER LINE ANTENNA

John Drysdale Reid, Cincinnati, Ohio, assignor to Avco Manufacturing Corporation, Cincinnati, Ohio, a corporation of Delaware Application January 6, 1949, Serial No. 69,485

5 Claims. (Cl. 250—16)

The present invention relates to a novel power line antenna of particular utility with frequency modulation or television receivers and suitable for use with VHF (very-high frequency) and UHF (ultra-high frequency) receivers generally.

One prior art power line antenna comprises a pair of chokes, which isolate the power line from the receiver proper, and a resonant circuit with lumped constants coupled across the line for applying the signal voltage existing between the lines to the receiver input. In an equivalent prior art antenna, one side of the line is R. F. (radio frequency) by-passed to ground, and a tuned circuit comprising lumped inductance and distributed capacitance is inserted in series between the other side of the line and ground. In still another conventional power line antenna, the two power line leads are treated as one, and the voltage between both lines and chassis, acting as a counterpoise, is applied to the receiver. All of the aforementioned circuits involve the use of expensive chokes and connections between choke and power transformer primary. Some of them require careful and critical choke designs in order to make the choke self resonant within the band of the received carrier signals. The following patents are typical of these classes of prior art: U. S. 1,683,716 to Espenschied; U. S. 1,737,078 to Elliott; U S. 1,768,196 to Elliott; U. S. 1,856,310 to Blatterman; U. S. 2,031,555 to Blatterman; British 340,389 of 1931.

The primary objects of the present invention are to eliminate chokes and associated choke connections, to dispense with critical choke designs, and to provide a very simple self-contained antenna unit.

In accordance with the invention there is provided, in a VHF or UHF receiver, the combination of a pair of service conductors included in a power cord, said service conductors being adapted to be R. F. short-circuited at the receiver power transformer or similar location and connected at their ends remote from the receiver to the power lines, and a pair of conductors comprising a transmission line, said transmission line being coupled to the signal input circuit of said receiver and having a portion which is disposed in parallel with said service conductors and is reactively coupled thereto, said coupling portion extending outwardly from a point on said service conductors electrically displaced from said R. F. short-circuited end by an odd quarter-wave length at mid-carrier frequencies of the signals to be received.

For a better understanding of the present invention, together with other and further objects, advantages and capabilities thereof, reference is made to the following detailed description of the accompanying drawings, in which there is illustrated a preferred embodiment of a power line antenna in accordance with the present invention.

Figure 4:
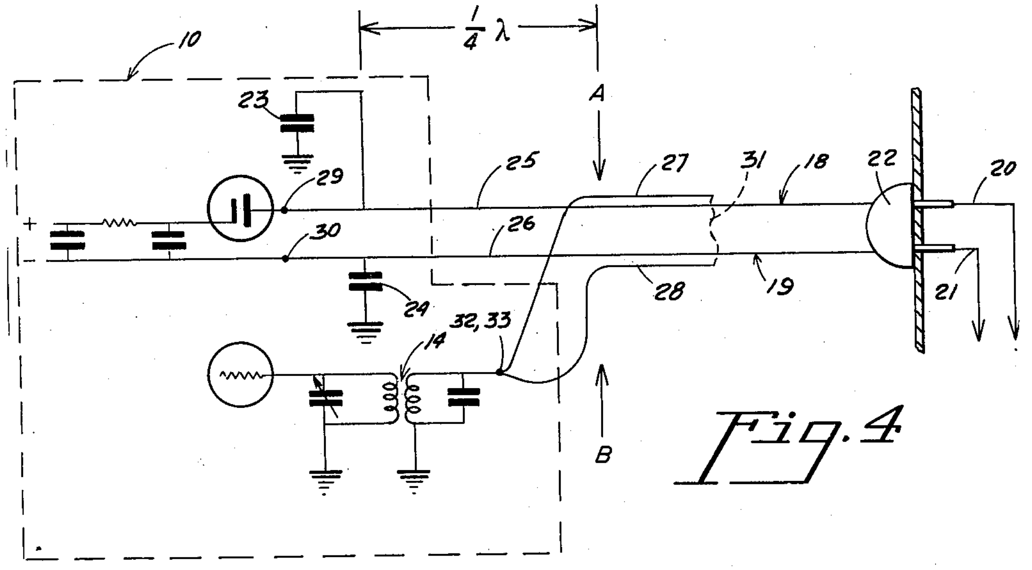
Figure 5:
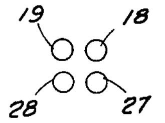
Figure 6:
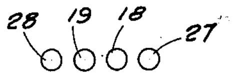
Figure 7:
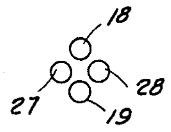

Fig. 4 is a circuit diagram of my novel power line antenna as coupled to an unbalanced signal input circuit at the receiver, the receiver being of the A. C.—D. C. type, in which a power transformer is not used;

Figs. 5, 6, and 7 show in section suitable arrangements for coupling the transmission line conductors to the service line conductors.

Figure 2:
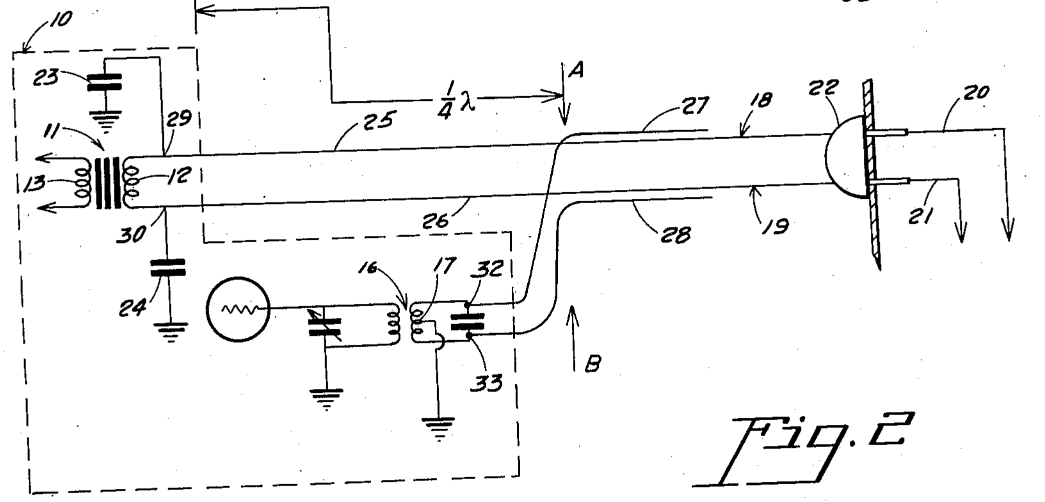
Fig. 2 is a circuit diagram thereof, as employed in conjunction with a balanced signal input circuit at the receiver.
Figure 3:
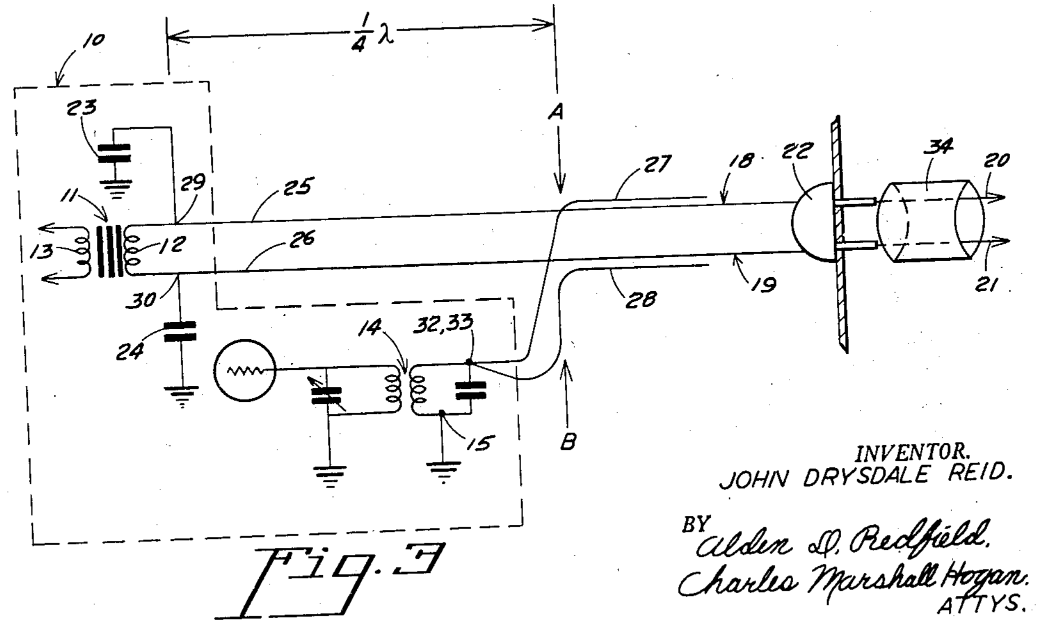
Fig. 3 is a circuit diagram of my novel power line antenna as coupled to an unbalanced signal input circuit at the receiver.

In Figs. 2 and 3 there is shown a receiver 10 having a power transformer 11, including a primary 12 and a secondary 13 coupled in conventional manner to a rectifier (not shown). The receiver includes a conventional antenna input circuit, in Fig. 3 so connected as to comprise a double-tuned transformer 14 with one primary lead 15 grounded, providing an unbalanced signal input circuit, and in Fig. 2 so connected as to comprise a double-tuned transformer 16 with a grounded primary center tap 17, providing a balanced signal input circuit.

It will, of course, be understood that the circuit conditions may be changed from those illustrated in Fig. 2 to those shown in Fig. 3, and vice versa, by simple switching arrangements which will now be obvious to those skilled in the art.

The power service conductors 18 and 19 are connected to power lines 20 and 21, respectively, through a plug 22 at their ends remote from the receiver 10 and at a suitable wall outlet which need not be shown in detail herein. The other power service cord leads 29, 30 are connected to the power transformer primary terminals (Figs. 2, 3) or the power input terminals (Fig. 4). The power service conductors 18, 19 are R. F. short-circuited and grounded to chassis in conventional manner by capacitors 23 and 24 in order to isolate the service conductors from the power transformer—rectifier system—so far as R. F. signals are concerned. The distributed capacitance of the power transformer primary may be employed in lieu of a lumped capacitor 23, if desired.

Referring now to Fig. 2 and looking toward the primary of the power transformer from points A, B, electrically displaced from the R. F. short-circuited end by a quarter-wave length along service conductors 18, 19, or any odd-multiple of a quarter-wave length, portions 25 and 26 of the service conductors 18, 19 constitute a short-circuited quarter-wave length line, at approximately the mean frequency of the desired reception band. Therefore, the equivalent of a very high resistive impedance or parallel resonant circuit appears to be present between points A, B. Further, the R. F. voltage difference between conductors 18, 19 is greatest at these quarter-wave points A, B, or at any points electrically displaced from the R. F. short-circuited end by an odd-multiple of a quarter-wave length. Preferably a single quarter-wave length displacement is provided. It will be understood that those portions of conductors 27 and 28 which are between points A, B and the receiver signal input are very short in length, preferably only three inches or so.

In accordance with the invention I couple to the service conductors a transmission line comprising a pair of conductors 27 and 28. This line may be placed over or under the service line, as shown in Fig. 5, or placed alongside the service line, as shown in Fig. 6, or placed between the service line conductors, as shown in Fig. 7. If desired, the line may be terminated at its end remote from the receiver by an impedance in the form of a resistor 31, shown in dotted outline in Fig. 4. However, best results have been obtained in practice without this terminating resistor. The other end of the transmission line 27, 28 is connected to the primary of the antenna input circuit at the receiver. In Fig. 3 both of the transmission line leads 32, 33 are connected to the ungrounded side of the antenna input transformer primary. In Fig. 2 the leads are separately connected to the antenna input primary terminals. The portions of conductors 27 and 28 which extend outwardly from the quarter-wave points A, B constitute coupling means whereby the transmission line is reactively coupled to the service conductors 18, 19. As indicated above, in general it will be found preferable to leave the far end of the transmission line open, but in some cases it may be found desirable to terminate it with a resistor such as 31 (Fig. 4).

Referring now to Fig. 2, the transmission line is coupled to service conductors 18, 19, thereby to pick up the voltage differential between the power lines 20, 21. It will be understood that those power lines constitute the main pick-up elements of the Fig. 2 antenna system, particularly where the power lines are spaced apart and not shielded, the service conductors 18, 19 being used primarily as a transmission line only. The Fig. 2 embodiment operates in "push-pull," as it were, to pick up the voltage difference between lines 20, 21.

In the Fig. 3 embodiment, both conductors 27, 28 are connected to the ungrounded lead of transformer 14 (i. e., the lead not connected to the chassis), whereby the operation is in "push-push" to pick up the difference between the voltages on the service line and chassis. This embodiment is of particular utility in an environment wherein the power lines 20, 21 are enclosed in a shield or conduit such as element 34. The transmission line and the service conductors are then the main pick-up elements. Both sides of the transmission line 27, 28 are effectively in parallel and coupled to the service line, the two conductors of which are then effectively in parallel. Section 25, 26 of the service line still serves to isolate the service conductors from chassis or ground, affording a point of maximum voltage at A, B when the section 25, 26 is an odd number of quarter waves in electrical length.

The section of transmission line between the service lines and the receiver signal input terminals is, in general, not critical. However, for a specific case, such as the FM band, performance at the low frequency end of the band may be improved by making this section very short, permitting sections 25 and 26 of the service line, and those portions of the transmission line between points A, B and the receiver signal input, to function effectively as a quarter-wave length pick-up loop. Those portions may be arranged in a loop configuration for this purpose. In the aggregate they resonate below the band and improve pick-up at the low frequency end.

Figure 1:
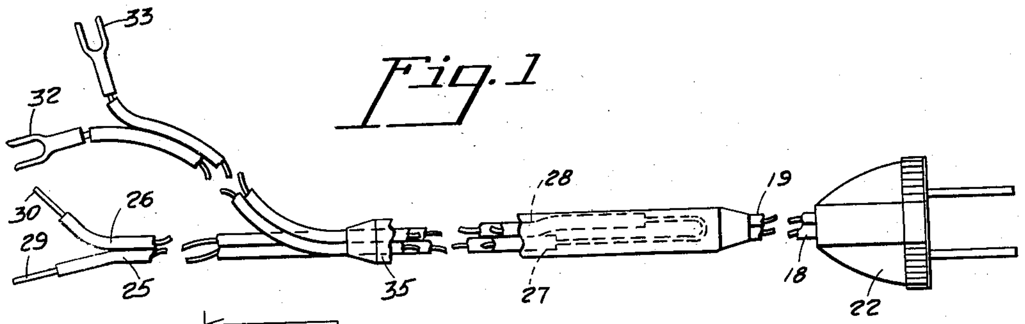
Fig. 1 is a perspective view of my novel power line antenna unit.

Referring to Fig. 1, for example, it will be seen that the actual construction of my self-contained antenna attachment is very simple. A preferably quarter-wave length section of conductors 27, 28 is simply laid alongside and outside of insulated service conductors 18, 19, and the ensemble is molded together or otherwise secured together by appropriate insulating material, each of the four conductors being insulated from the others. Alternatively, the arrangements shown in Figs. 5 or 7 may be employed.

It will be appreciated that, in general, the ground points indicated in the drawings refer to the chassis.

An important feature of my invention resides in its particular utility in television receivers. If sections 25 and 26, for example, have a quarter-wave length at the midpoint of the present television broadcast channel No. 3, they will have a three-quarter-wave length with respect to the mid-point of channel No. 10. The mid-point of channel No. 3 is approximately in the center of the higher frequency television broadcast channels. Therefore, the antenna provided in accordance with the invention functions very effectively throughout all presently standardized and commercially employed television channels.

This construction is very simple, it utilizes no chokes, no choke connections, and it can be manufactured in quantity at a very low cost.

While there have been shown and described what are presently considered to be the preferred embodiments of the present invention, it will be understood by those skilled in the art that various modifications may be made therein without departing from the true scope of the invention as defined by the appended claims.

Having fully disclosed and described my invention, I claim:

1. A self-contained antenna unit comprising a two-conductor service cord for the power supply circuit of a two-conductor radio receiver and a transmission line which is connected at one end to the signal input circuit of said receiver, said transmission line having a section at its other end electrostatically coupled to and spaced from the conductors of said service cord, said section beginning at points electrically spaced from the receiver power-input end of said cord by an odd quarter-wave length measured with respect to the middle of the received signal band, said section extending outwardly in parallel with said cord in a direction away from the receiver power-input end of said cord.

2. A self-contained antenna unit comprising a two-conductor service cord for the power supply circuit of a radio receiver and a two-conductor transmission line which is connected at one end to the signal input circuit of said receiver, said transmission line having a quarter-wave section at its other end closely spaced from and capacitively coupled to the conductors of said service cord, said section beginning at points electrically spaced from the receiver power-input end of said cord by a quarter-wave length at received signal frequency and extending in a direction along said cord and away from the receiver power-input end of said cord.

3. In a frequency modulation receiver, the combination of a pair of service conductors included in a power cord, said service conductors being connected to a receiver power input and connected at their ends remote from the receiver to the power lines, and a pair of conductors comprising a transmission line, said transmission line being connected to the signal input circuit of said receiver and having a portion which is disposed in parallel with said service conductors and is reactively coupled thereto, said portion comprising a coupling means which extends outwardly toward the power line end from a point electrically displaced from said power transformer end by an odd multiple of a quarter-wave length at carrier frequencies.

4. In a frequency modulation receiver, the combination of a pair of service conductors included in a power cord, said service conductors being connected at their ends remote from the receiver to the power lines, means for R. F. short-circuiting and grounding said conductors at the receiver power-input end, and a pair of conductors comprising a transmission line, said transmission line being connected to the signal input circuit of said receiver and having a portion which is disposed in parallel with said service conductors and is reactively coupled thereto, said portion comprising a coupling means which extends outwardly, in a direction away from the receiver power-input end, from a point electrically displaced and begins at said receiver power-input end by a quarter-wave length at carrier frequencies.

5. In a very-high frequency receiver, the combination of power-input circuit including a two-conductor service cord and means for radio frequency close-circuiting said conductors at their ends adjacent the receiver, a two-conductor transmission line connected at one end to the signal input circuit of the receiver and having a section at the other end spaced from and electrostatically coupled to the conductors of said service cord, said section beginning at a point displaced by a quarter-wave length from said end adjacent said receiver and extending in a direction away from said end adjacent said receiver, the remainder of said transmission in excess of said section being very short, whereby said remainder and the radio frequency closed-circuited portion of said cord between said end adjacent said receiver and said point form a pickup loop resonant at the low end of the tuning range of said receiver, the expressions "closed-circuited" and "quarter-wave" relating to the mid-frequency of the band of received signals.

JOHN DRYSDALE REID.

REFERENCES CITED

The following references are of record in the file of this patent:

UNITED STATES PATENTS

| Number | Name | Date |
|---|---|---|
| 1,745,096 | Jayne | Jan. 28, 1930 |
| 1,744,091 | Wrape | Jan. 21, 1930 |
| 1,970,986 | Tarnol | Aug. 21, 1934 |

FOREIGN PATENTS

| Number | Country | Date |
|---|---|---|
| 590,688 | France | June 20, 1925 |
| 37,190 | Denmark | Feb. 18, 1927 |

OTHER REFERENCES

Radio News, April 1924, page 1425

Certificate of Correction

Patent No. 2,520,811 August 29, 1950

JOHN DRYSDALE REID

It is hereby certified that error appears in the printed specification of the above numbered patent requiring correction as follows:

Column 1, line 20, after the word "receiver" and before the period insert *input*; column 4, line 66, before "radio" strike out "two-conductor" and insert the same before "transmission" in line 67;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*